G. H. GRUSS.
SHOCK ABSORBER.
APPLICATION FILED OCT 20, 1919.
1,387,706.
Patented Aug. 16, 1921.
2 SHEETS—SHEET 2.
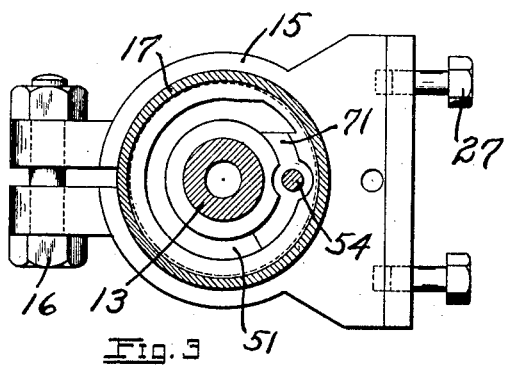
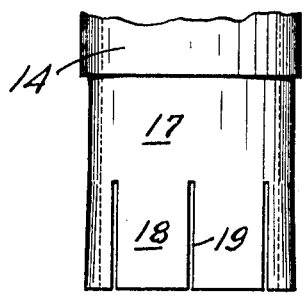
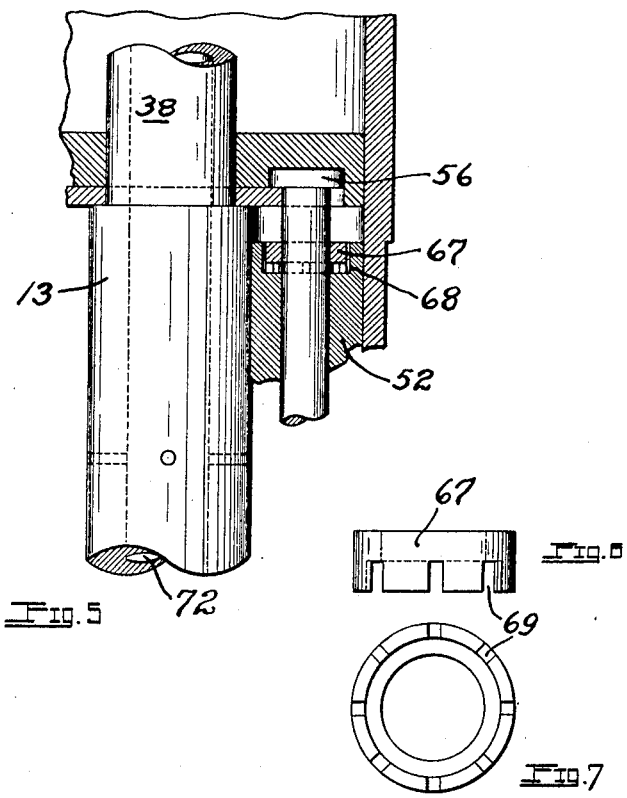
WITNESS:
C. S. Evans
INVENTOR.
GEORGE H. GRUSS.
BY White & Prost
his ATTORNEYS.

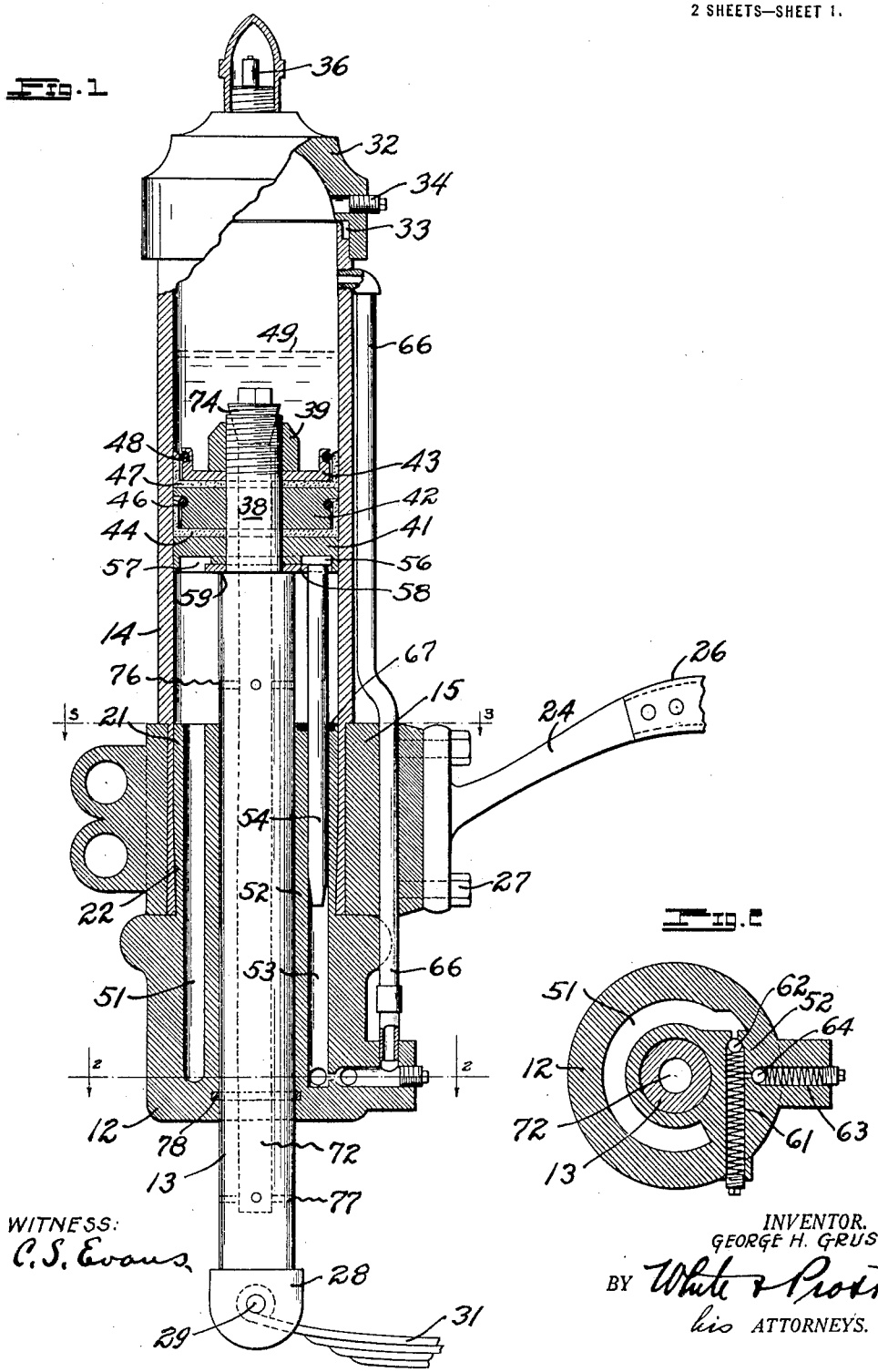

UNITED STATES PATENT OFFICE.

GEORGE H. GRUSS, OF SAN FRANCISCO, CALIFORNIA, ASSIGNOR, BY DIRECT AND MESNE ASSIGNMENTS, OF ONE-FOURTH TO L. E. BEDFORD AND ONE-FOURTH TO CACHOT THERKELSEN, BOTH OF SAN FRANCISCO, CALIFORNIA.

SHOCK-ABSORBER.

1,387,706.  Specification of Letters Patent.  Patented Aug. 16, 1921.

Application filed October 20, 1919. Serial No. 331,907.

*To all whom it may concern:*

Be it known that I, GEORGE H. GRUSS, a citizen of the United States, and a resident of the city and county of San Francisco and State of California, have invented a new and useful Shock-Absorber, of which the following is a specification.

My invention relates to devices interposed between the load-bearing wheels and the body of a vehicle for absorbing vibrations and shocks.

An object of the invention is to provide a shock absorber in which improved means are provided for returning to the compression chamber the sealing fluid which is gradually forced out of the compression chamber during the operation of the device.

Another object of the invention is to provide a shock absorber in which the means for returning the sealing fluid to the compression chamber operates during the period of lowering pressure in the chamber.

Another object of the invention is to provide a shock absorber in which leakage past the piston rod is reduced to a minimum.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a vertical sectional view taken through the axis of the device. Fig. 2 is a horizontal sectional view taken in a plane indicated by the line 2—2 of Fig. 1. Fig. 3 is a horizontal sectional view taken in a plane indicated by the line 3—3 of Fig. 1. Fig. 4 is an elevation of the lower end of the compression chamber cylinder before assembly. Fig. 5 is a vertical sectional view on a larger scale of a portion of the device, the piston being shown in a somewhat lower position than in Fig. 1. Figs. 6 and 7 are respectively an elevation and bottom view of the washer surrounding the pump plunger.

The shock absorber of my invention comprises a base block 12 formed with an aperture in which the piston rod 13 forms a sliding fit. A compression chamber cylinder or casing 14 is mounted upon the base and locked in permanent engagement therewith by the split clamp ring 15, through the lugs of which, bolts 16 are passed. In order to secure a locked engagement between the casing and base one end of the casing which conveniently is a piece of steel tubing is reduced in outside diameter, the upper part 17, Fig. 4 being cylindrical, but the lower part 18 being flared or tapered outwardly a small amount, and longitudinal slots 19 being cut in the flared portion to permit deformation of the flared end. The upper end of the base is reduced in diameter to fit within the end of the casing, the upper end 21 of the reduced portion being formed cylindrically to snugly fit within the interior of portion 17 and the lower part 22 of the reduced portion being tapered inwardly an amount equal to the outward taper of the casing. The clamp ring 15 is formed with a cylindrical opening of the same size as the cylindrical portion 17 of the casing, and where the casing is assembled upon the base and the clamp ring tightened about them, the tapered split ends 18 of the casing are forced inwardly into tight engagement with the tapered portion 22 of the base, the outer surface of the reduced portion of the casing being then cylindrical and engaged over its entire length with the clamp wall. The taper on the casing end is thus complemented by the taper on the base, and the two are held in rigid locked engagement by the clamp. In addition to its function of holding the casing in locked engagement with the base, the clamp provides means for mounting the device. A bracket 24 secured rigidly to the end 26 of the vehicle frame is attached to the clamp by screws 27. A yoke 28 on the lower end of the rod 13 is connected by pin 29 to the end of the leaf spring 31.

The upper end of the casing 14 is closed by a cap 32 brazed thereon, a recess 33 being formed above the joint for the retention of a quantity of sealing fluid in case of an imperfect joint which would otherwise permit the leakage of air from the compression chamber. A drain and filling plug 34 is arranged in the cap, which is also provided with a valve 36 of known type for permitting air under pressure to be introduced into the compression chamber.

The upper end of the piston rod 13 is reduced in diameter to provide a stud 38 upon which the piston head is held by the nut 39. The piston head is formed of three disks 41, 42 and 43, the first two of which form a sliding fit with the casing. Between the disks 41 and 42, a leather cup 44 is disposed, the sides of the cup lying contiguous to the wall of the casing, and extending upwardly in an annular recess formed in the periphery of the disk 42. In order to retain the edge of the cup in snug engagement with the casing wall, a circular round wire spring 46 is disposed around the disk and against the inner upper edge of the cup, which is preferably beveled slightly. This construction has been found to give the best results in the matter of leakage past the cup. Between the disks 42 and 43, a second cup 47 is disposed. The beveled upper edge of this cup is also resiliently held against the casing wall by the spring 48, seated in an annular recess in the disk 43. Thus the "sharpened" upper edges of the two cups are resiliently retained against the casing wall, and with the introduction of a quantity of sealing liquid 49, preferably a heavy oil, above the piston, the air above the oil is effectively retained and the leakage of the oil past the piston head is reduced to a minimum.

Means are provided for collecting oil which leaks past the piston and returning it to the compression chamber during the period when the pressure in the compression chamber is falling, or at the minimum. The base 12 is formed with a well 51 which extends annularly for about three quarters of the distance around the base block as best shown in Fig. 2, and in which the oil collects. In the solid portion or web 52 which separates the ends of the well, is formed a cylindrical bore 53 in which a plunger rod 54 is adapted to reciprocate. Preferably the lower end of the plunger rod is tapered and the upper end is provided with a flange 56 seated in the annular groove 57 formed in the under surface of the disk 41. The flange is retained in the groove by an annular collar 58 disposed between the disk 41 and the shoulder 59 on the rod 13, the collar projecting over the edge of the groove and under the flange 56. Thus the plunger rod is securely held to the piston head, the downward pressure of the head being exerted on the entire surface of the flanged end of the plunger rod, and at the same time rotary movement of the piston and piston rod is permitted relative to the base block and casing, such movement occurring during the functioning of the apparatus. This construction is also found to facilitate the easy assembling of the parts of the device. At the bottom of the bore, a transverse passage 61 opening into the well 51 is arranged, and is controlled by the spring-pressed ball 62, which forms a check valve. A second transverse passage 63 opens out of the passage 61 and entrance to this passage is controlled by the spring-pressed ball or check valve 64. The last named passage is placed in communication with the compression chamber by conductor 66.

On the upward stroke of the piston due to the downward movement of the vehicle, any oil in the well is drawn past the check valve 62 into the transverse passage 61 and bore 53. On the downward stroke of the piston such oil is forced past the check valve 64 into the passage 63 and conductor 66 from which it flows back into the compression chamber. It should be noted that this action occurs during the downward stroke of the piston head, during which the pressure in the compression chamber is lessening toward the minimum. This is no inconsiderable advantage and contributes to the resiliency and sensitiveness of the device. Sometimes when there is little oil in the well, more or less air is drawn into the bore 53. This is not pumped into the compression chamber but passes upwardly past the plunger rod, escaping back into the well chamber. With this air is carried a certain quantity of finely divided oil which it is not desired shall be sprayed into the space below the piston head. To avoid this, I place a condensing ring 67, shown in Figs. 6 and 7 loosely about the plunger rod in a recess 68 formed in the top of the web 52. The air carrying the finely divided oil and coming up around the plunger rod under some pressure expands on emerging into the recess 68 and sprays the oil over the inner surface of the ring. The oil here condenses or coalesces, running through the slots 69 into the recess 68 and through the grooves 71 back into the well.

Means are provided for creating a partial vacuum under the piston head on its upward stroke, as a further aid in checking the downward movement of the vehicle; and for creating an air cushion under the piston head to prevent pounding on its downward stroke. A hole 72 is formed longitudinally of the piston rod 13, the end of the hole being closed by the tapered plug 74. Holes 76 are then formed transversely through the rod some distance below the piston head, and holes 77 some distance above the yoke 28. Thus during a normal movement of the piston head in the casing, the chamber below the piston head is in communication with the open air. The holes 76 are relatively small so that the passage of air into and out of the chamber below the piston is greatly restricted, and with a rising of the piston in the casing the chamber is at once rarefied, atmospheric air entering but slowly through the passages, until the holes 77 are covered. From this point on the partial vacuum in the chamber rises in degree, supplementing the air pressure in the compression chamber in checking the downward movement of the car.

Movement of the piston downwardly in the casing compresses the air in the chamber below the piston, the pressure being slowly relieved by escape of the confined air through the passages, until the holes 76 are covered. The remaining air in the chamber is then trapped and with further lowering of the piston, it is heavily compressed and acts as a cushion or snubber to control the further upward movement of the car, thus making the use of separate snubbing devices unnecessary.

The piston rod is lubricated by the sealing oil and some of this gradually works down toward the yoke 29. In order to prevent dust adhering to the exposed end of the rod working upwardly into the device on the rod, a packing ring 78 is disposed in an annular groove adjacent the lower end of the base block.

I claim:

1. In a shock absorber, a base block having a tapered end, a tube having a tapered end complementary to and adapted to inclose the tapered end of the base, and a clamp ring for locking the tapered ends together.

2. In a shock absorber, a base block having a tapered end, a tube having a tapered end complementary to and adapted to inclose the tapered end of the base, a clamp ring for locking the tapered ends together, and means for mounting the shock absorber attached to said clamp ring.

3. In a shock absorber, a base block having a portion tapered inwardly from a cylindrical end, a tube adapted to fit over the cylindrical end and tapered portion of said base and having that part opposite the tapered portion of the base tapered outwardly, and a clamp ring adapted to inclose the tube to compress the outwardly tapered end thereof into locked engagement with the inwardly tapered portion of the base.

4. In a shock absorber, a base block having a portion tapered inwardly from a cylindrical end, a tube adapted to fit over the cylindrical end and tapered portion of said base and having that part opposite the tapered portion of the base tapered outwardly and provided with slots longitudinally of the tube, both tapers being in the same degree, and a clamp ring formed with a cylindrical bore therein adapted to inclose the tube to compress the outwardly tapered split ends thereof into locked engagement with the inwardly tapered portion of the base.

5. In a shock absorber, a base block having a portion tapered inwardly from a cylindrical end, a tube adapted to fit over the cylindrical end and tapered portion of said base and having that part opposite the tapered portion of the base tapered outwardly and provided with slots longitudinally of the tube, both tapers being in the same degree, a clamp ring formed with a cylindrical bore therein adapted to inclose the tube to compress the outwardly tapered split ends thereof into locked engagement with the inwardly tapered portion of the base, and means for tightening the clamp ring and attaching it to the frame of the vehicle on which the said shock absorber is used.

6. In a shock absorber, a casing forming a compression chamber, a piston slidably arranged in said casing, a sealing liquid disposed in said chamber above said piston, and means for introducing into said compression chamber during the period of lowering pressure therein the sealing liquid which leaks past said piston.

7. In a shock absorber, a casing forming a compression chamber, a piston slidably arranged in said casing, a sealing liquid disposed in said chamber above said piston, means for collecting the sealing liquid leaking past said piston, and means operative during the period of lowering pressure in the compression chamber for reintroducing the collected liquid into the compression chamber.

8. In a shock absorber, a casing forming a compression chamber, a piston slidably arranged in said casing, a sealing liquid disposed in said chamber above said piston, means for collecting the sealing liquid leaking past said piston, means operative during the period of lowering pressure in the compression chamber for reintroducing the collected liquid into the compression chamber, and means for preventing the introduction of air into said compression chamber with said collected liquid.

9. In a shock absorber, a base, a casing forming a compression chamber secured to said base, a piston rod slidably arranged in said base, a piston on said rod in said casing, a sealing liquid disposed in said chamber above said piston, a well in said base for collecting sealing liquid leaking past said piston, a bore in said base, a plunger rod secured to said piston disposed in said bore, passages connecting said bore to said well and to said compression chamber, and check valves disposed in said passages whereby movement of the piston to augment the pressure in said compression chamber moves said plunger rod to draw collected sealing liquid into said bore and recovery movement of the piston moves said plunger rod to force the liquid in the bore into the compression chamber.

10. In a shock absorber, a base, a casing forming a compression chamber secured to said base, a piston rod slidably arranged in said base, a piston on said rod in said casing, a sealing liquid disposed in said chamber above said piston, a well in said base for collecting sealing liquid leaking past said piston, a bore in said base, a plunger rod secured to said piston disposed in said bore, passages connecting said bore to said well and to said compression chamber, check valves disposed in said passages whereby movement of the piston to augment the pressure in said compression chamber moves said plunger rod to draw collected sealing liquid into said bore and recovery movement of the piston moves said plunger rod to force the liquid in the bore into the compression chamber, and means for permitting air drawn into the bore to escape therefrom.

11. In a shock absorber, a base, a casing forming a compression chamber secured to said base, a piston rod slidably arranged in said base, a piston on said rod in said casing, a sealing liquid disposed in said chamber above said piston, a well in said base for collecting sealing liquid leaking past said piston, a bore in said base, a plunger rod disposed in said bore, means for mounting said plunger rod for longitudinal movement with said piston rod and permitting rotary movement of the piston rod relative thereto, and valve-controlled passages connecting said bore to said well and to said compression chamber.

12. In a shock absorber, a base, a casing forming a compression chamber secured to said base, a piston rod slidably arranged in said base, a piston on said rod in said casing, a sealing liquid disposed in said chamber above said piston, and passages in said piston rod for placing the chamber below said piston in communication with the atmosphere during the normal movement of the piston short of its extreme positions.

13. In a shock absorber, a base, a casing forming a compression chamber secured to said base, a piston rod slidably arranged in said base, a piston on said rod in said casing, a sealing liquid disposed in said chamber above said piston, and passages in said piston rod for placing the chamber below said piston in communication with the atmosphere, said passages being covered by said base during movement of the piston adjacent either of its extreme positions.

In testimony whereof, I have hereunto set my hand at San Francisco, California, this 10th day of October, 1919.

GEORGE H. GRUSS.

In presence of—
  C. S. Evans.